Nov. 4, 1930. E. O. LANHOFFER 1,780,560
PROCESS AND APPARATUS FOR REPRODUCING BY STAMPING
Filed Aug. 2, 1928
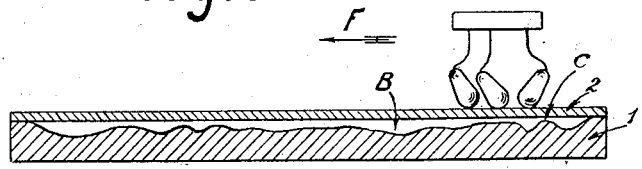
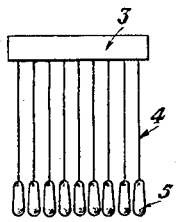 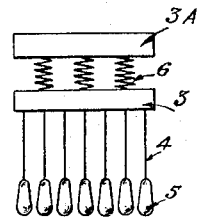
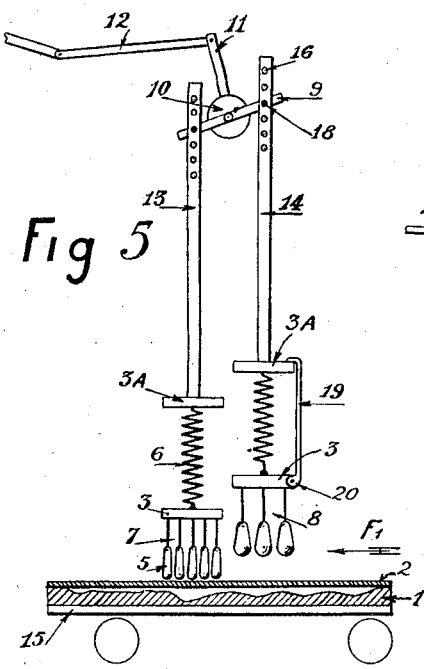 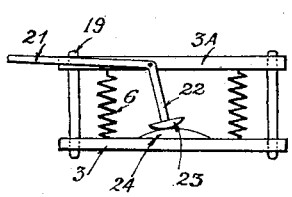
Inventor:-
Edmond Oscar Lanhoffer
by Brown Seward
attorney Patented Nov. 4, 1930

1,780,560

UNITED STATES PATENT OFFICE

EDMOND OSCAR LANHOFFER, OF POISSY, FRANCE, ASSIGNOR TO ASBESTOS PANELS CORPORATION, OF NEW YORK, N. Y., A CORPORATION

PROCESS AND APPARATUS FOR REPRODUCING BY STAMPING

Application filed August 2, 1928, Serial No. 297,041, and in France December 24, 1927.

My invention relates to a process and apparatus for reproducing by stamping.

As is known in the art in connection with certain industries there is frequently occasion to reproduce models by stamping a plate of a malleable substance placed on the surface of a matrix containing the relief portions of the model in intaglio and vice versa.

My invention contemplates a process for obtaining such productions with great simplicity and at the same time with great accuracy.

According to my invention, the process consists in beating a plate of malleable material placed over a matrix, with one or several successive beating elements adapted to be displaced from one extremity to the other of said matrix and of a special character which form one of the chief objects of my invention.

My invention likewise contemplates a machine for carrying my process into practice, said machine being particularly suitable for use with two or more beating elements.

Other objects of my invention will be obvious to those skilled in the art to which my invention relates in the following description when taken in connection with the accompanying drawing forming part of this specification and in which—

Fig. 1 is a conventional diagram illustrating in section the general principles of the invention;

Figs. 2, 3 and 4 are detail views of the beating elements;

Fig. 5 is a diagrammatic elevation view with parts in section of a machine provided with two successive beaters; and Fig. 6 is a diagrammatic detail.

Referring to Fig. 1, a matrix or mould in intaglio 1 is provided upon which is placed the malleable material 2 on which it is desired to produce very accurately the outline of mould 1.

According to the invention the plate 2 placed on the mould 1 is beaten with beating elements arranged as shown in Fig. 2.

On a flat member or plate 3 are fixed a certain number of flexible wires or chains 4 each carrying at its extremity a rounded weight 5.

By permitting the beater thus arranged to fall from a relatively high distance on to the plate 2, the bodies 5 exert a pressure on said plate which is due to both the shock produced and the weight of the bodies 5. Certain of said weights, when they attain the plate 2 take oblique positions such as those illustrated in Fig. 1, which has for effect to compress the material of which the plate 2 is formed into all the folds and twists of the mould 1.

Theoretically it would be sufficient to thus displace a single beating element in the direction of the arrow F from one extremity of plate 2 placed on the mould 1 to the other.

This will be sufficient if the hollows and projections of the mould are not very pronounced and the plate 2 is of a very malleable material but in most cases the under surface of the plate 2 cannot be compressed over and into the reliefs and hollows of the mould 1 very accurately unless the plate be subjected to several beating operations successively by means of beating elements such as those of Fig. 2 but in connection with which the weights are of gradually decreasing diameters and more numerous. It will immediately be seen that a beating operation with a beating unit provided with rather large weights 5 will roughly produce the work which is completed by successive beating elements by employing for example a beating element such as represented in Fig. 3 and if necessary other beating elements successively whose weights gradually become smaller and more numerous in order to better compress the malleable material according to all the details of the mould.

I have discovered that the desired result is produced even better by arranging the beating elements as shown in Fig. 4. Instead of a single plate or flat member to which are attached the wires or chains 4, two plates 3 and 3ª are provided which are connected together by means of springs 6.

It will be noticed that if the plate 3ª is given movements of constant amplitude by displacing in the direction of the arrow F from one extremity of plate 2 to the other, the movements of the plate or flat member 3 will be given a movement of variable amplitude which is a function of the depth of the hollows. For example, the amplitude will be greater above the region B than above the region C of mould 1. Such an arrangement is very favorable because it automatically establishes a striking effort and compression whose magnitude will depend upon that of the hollow of the mould, that is, the plate 2 will, in fact be tamped or compressed more energetically.

It is to be understood that I may, without departing from the spirit of the invention, utilize beating elements such as in Figs. 2 and 3 or better of the type in Fig. 4 and operate them by any suitable expedient and even be operated by hand if desired. Nevertheless it is advantageous to effect the beating operation entirely mechanically and in this end the invention contemplates a machine particularly suitable for carrying the above described process into practice.

The said machine is illustrated in Fig. 5 and comprises two beating elements 7 and 8 of the type illustrated in Fig. 4 connected to the extremities of a rod 9 secured to a shaft 10. Said shaft is given an alternating rotary movement by means of a crank 11 and a connecting rod 12 in turn driven by an eccentric, piston or other suitable means (not shown).

Each extremity of the rod 9 carries a vertical rod 13 and 14 respectively to each of which are secured the devices 7 and 8 respectively. It will be immediately seen that when the connecting rod 12 is given a to and fro movement the rods 13 and 14 and hence the heating elements 7 and 8 will also be given a to and fro movement in the vertical direction and opposite to each other. On the other hand the mould covered with the plate to be beaten is placed on a carriage 15 adapted to be progressively advanced in the direction of the arrow F¹ by a well known expedient (not shown) such as a pawl and ratchet arrangement, worm and worm wheel or the like.

It will immediately be noticed that the various parts of the plate 2 are subjected first to the shocks of beating element 8 and then to the shocks of beating element 7. The beating element 8 is constructed of relatively large elements small in number and the beating element 7 is composed of small elements and large in number, with respect to those of element 8.

For adjusting the length of stroke of the said beating elements the rods 13 and 14 are provided with a series of holes 16 and rod 9 is provided with corresponding holes through which extends a pin 18.

When the machine commences to operate the two beating elements or at least the element 7 strikes in space. If it be assumed that the relative weight of the beating elements constituted by the bar 3 be considerable with respect to the weights 5, the amplitude of the part 3—5 will take under the action of spring 6 a value which would risk damaging the machine. Furthermore at rest it is well to support the spring 6 in order to prevent stretching. For this purpose a hooking mechanism constituted for example by a hook 19 pivoted at 20 to the lower plate 3 and hooking over the upper plate 3ª. When the machine starts to operate, the hook is rocked by means of a suitable lever disposed at one end of the machine. Finally for preventing, at rest, under the influence of eventual shocks, the plates 3 and 3ª from moving toward and from each other there has been provided between them a mechanism destined to maintain them constantly separated. The said mechanism is represented diagrammatically in Fig. 6 and comprises a bell-crank lever 21, 22 carrying at the extremity of one of its arms a shoe 23 adapted to bear on a supporting surface 24, preferably elastic and carried by the lower plate 3.

By operating this mechanism in the desired direction the plates 3 and 3ª tend to move away from each other but are held together by hooks 19, in a way that the said hooks are completely immobilized with respect to each other.

While I have described what I deem to be the preferable form of my device I do not wish to be limited thereto as there might be various changes made in the parts of my machine, in their disposition and arrangement as well as in the steps of my process without departing from the spirit of my invention as comprehended within the scope of the appended claims.

Having described my invention what I claim as new and desire to secure by Letters Patent is:

1. A process of reproducing of the type described which comprises placing a sheet of malleable material on a matrix, dropping a series of flexibly suspended weights on said sheet continually and causing relative displacement between said matrix and said sheet of material during dropping of said weights.

2. A process of reproducing of the type described which comprises placing a sheet of malleable material on a matrix, dropping a series of flexibly suspended weights of different sizes and weight on said sheet continually and successively and causing relative displacement between said matrix and said sheet of material during dropping of said weights.

3. A process of reproducing of the type described which comprises placing a sheet of malleable material on a matrix, dropping a series of flexibly suspended weights on said sheet continually, said sheet of material and said matrix being adapted to be moved during dropping of said weights.

4. A process of reproducing of the type described which comprises placing a sheet of malleable material on a matrix, dropping a series of flexibly suspended weights of different sizes and weight on said sheet continually and successively, said sheet of material and said matrix being adapted to be moved during dropping of said weights.

5. An apparatus of the type described comprising a mould, a plate disposed above said mould, a series of flexible elements on said plate, a rounded weight on each of said flexible elements, means for reciprocating said plate in a vertical direction, said mould being adapted to be moved beneath said weights for the purpose disclosed.

6. An apparatus of the type described comprising a mould, a plurality of plates disposed above said mould, a plurality of flexible elements on each of said plates, a series of rounded weights of different sizes disposed on said plates respectively, means for reciprocating said plates in a vertical direction, said mould being adapted to be moved beneath said weights for the purpose disclosed.

7. An apparatus of the type described comprising a mould, a plate disposed above said mould, a second plate, spring means for suspending said second plate from said first plate, a series of flexible elements on said second plate, a rounded weight on each of said flexible elements, means for reciprocating said plates in a vertical direction, said mould being adapted to be moved beneath said weights for the purpose disclosed.

8. An apparatus of the type described comprising a mould, a plurality of plates disposed above said mould, a plurality of flexible elements on each of said plates, a series of rounded weights of different sizes disposed on said plates respectively, means for reciprocating said plates in the vertical and means for regulating the height of said plates above said sheet for the purpose disclosed.

9. An apparatus of the type described comprising a mould, a plurality of plates disposed above said mould, a second plate for each of said first plates, spring means for suspending said second plates from said first plates, a series of flexible elements on each of said second plates, a series of rounded weights of different sizes disposed respectively on the flexible elements of said plates, means for reciprocating said plates in a vertical direction, said mould being adapted to be moved beneath said weights for the purpose disclosed.

10. An apparatus of the type described comprising a mould, a plate disposed above said mould, a second plate, spring means for suspending said second plate from said first plate, a series of flexible elements on said second plate, a rounded weight on each of said flexible elements, means for reciprocating said plates in a vertical direction, and means for preventing separation of said plates under the action of said weights, said mould being adapted to be moved beneath said weights for the purpose disclosed.

11. An apparatus of the type described comprising a mould, a plurality of plates disposed above said mould, a second plate for each of said first plates, spring means for suspending said second plates from said first plates, a series of flexible elements on each of said second plates, a series of rounded weights of different sizes disposed respectively on the flexible elements of said plates, means for reciprocating said plates in the vertical, and means for preventing separation of said plates under the action of said weights, said mould being adapted to be moved beneath said weights for the purpose disclosed.

12. An apparatus of the type described comprising a mould, a plate disposed above said mould, a second plate, spring means for suspending said second plate from said first plate, a series of flexible elements on said second plate, a rounded weight on each of said flexible elements, means for reciprocating said plates in the vertical, and a manually controlled latching lever for preventing separation of said plates under the action of said weights, said mould being adapted to be moved beneath said weights for the purpose disclosed.

13. An apparatus of the type described comprising a mould, a plurality of plates disposed above said mould, a second plate for each of said first plates, spring means for suspending said second plates from said first plates, a series of flexible elements on each of said second plates, a series of rounded weights of different sizes disposed respectively on the flexible elements of said plates, means for reciprocating said plates in the vertical, and a manually controlled latching lever for preventing separation of said plates under the action of said weights, said mould being adapted to be moved beneath said weights for the purpose disclosed.

14. In an apparatus of the type described the combination of an operating shaft, means for imparting alternate rotary movement to said shaft, a two-armed lever on said shaft, a rod connected to each of said arms, a plate carried by each of said rods, a spring on each of said plates, a second plate suspended on each of said springs, a plurality of weights flexibly suspended from one of said second plates, a plurality of relatively smaller weights suspended flexibly from the other of said plates and a displaceable mould beneath said weights for the purpose described.

15. In an apparatus of the type described the combination of an operating shaft, means for imparting alternate rotary movement to said shaft, a two-armed lever on said shaft, a rod adjustably and pivotally secured to each of said arms, a plate carried by each of said rods, a spring on each of said plates, a second plate suspended on each of said springs, a plurality of weights flexibly suspended from one of said second plates, a plurality of relatively smaller weights suspended flexibly from the other of said plates, manually releasable latching means for preventing separation of said plates under the action of said weights and a mould adapted to be moved beneath said weights for the purpose described.

In testimony, that I claim the foregoing as my invention, I have signed my name this 20th day of July, 1928.

EDMOND OSCAR LANHOFFER.